Figures 1, 2:
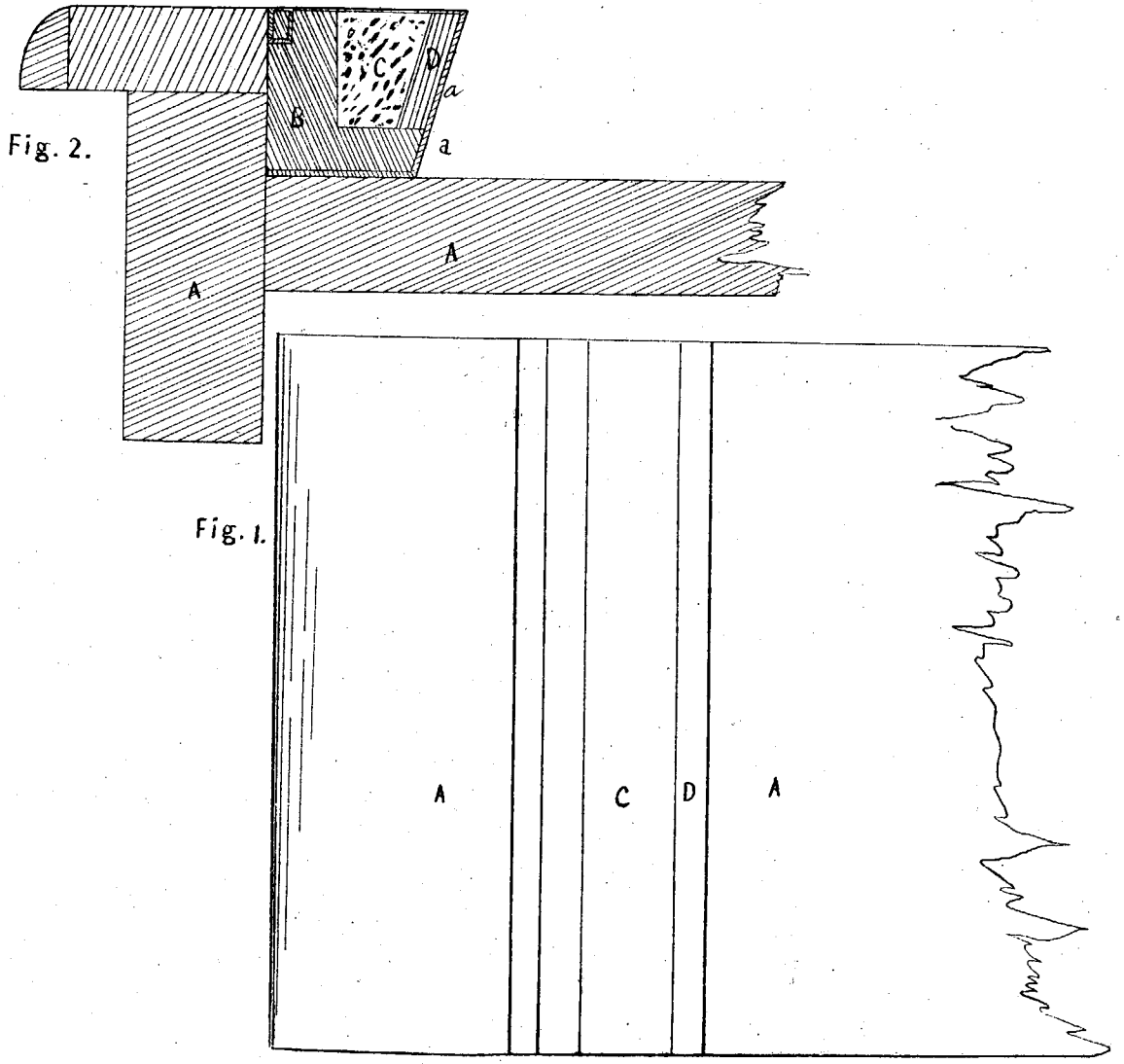

H. W. Collender
Billiard Cushions.

No. 799.

Reissued Aug. 23. 1859.

Witnesses:
Andrew Geder
W. H. Burdett

Inventor:
Hugh W. Collender

UNITED STATES PATENT OFFICE.

HUGH W. COLLENDER, OF NEW YORK, N. Y.

IMPROVEMENT IN BILLIARD-TABLE CUSHIONS.

Specification forming part of Letters Patent No. 18,805, dated December 8, 1857; Reissue No. 799, dated August 23, 1859.

*To all whom it may concern:*

Be it known that I, HUGH W. COLLENDER, of the city, county, and State of New York, have invented a new and useful Improvement in Billiard-Table Cushions; and I do hereby declare that the following is a full, clear, and exact description thereof, reference being had to the accompanying drawings, making part of this specification, in which—

Figure 1 is a plan or top view of a portion of a billiard-table with my said improved combination-cushion applied, but without the cloth covering, the better to represent the construction; and Fig. 2 is a vertical section of the same with the cloth covering put on.

The same letters indicate like parts in both figures.

My invention relates to an improvement on that class of billiard-table cushions known as combination-cushions, the principle of which is described in Letters Patent granted to Michael Phelan, bearing date the 19th day of February, 1856; and my said invention consists in composing cushions for billiard-tables with the body or back made of what is known as the soft compound of vulcanized india-rubber or allied gum, on account of its great, uniform, and permanent elasticity, in combination with a facing of india-rubber or allied gum rendered more dense, or, rather, less compressible, by the incorporation of fibrous substances or equivalents therefor with the gum, so that the face of the cushion shall be comparatively so dense that when struck it shall not permit the ball to embed itself, and yet so flexible as to readily yield to the blow of the ball to give full effect to the resilient action of the elastic body or back on the ball that it may be repelled at an angle from the line of the cushion as near as may be the reverse of the angle at which it was moving at the moment of impingement.

In the accompanying drawings, A represents the bed of the table, which may be of any known or suitable construction; B, the cushion shelf or bed, and C, the elastic body or back of the cusion, made of the soft compound of vulcanized india-rubber or allied gum, with a thin facing, D, of the same compound, rendered more dense, or, rather, less compressible, by fibrous or equivalent substances; and the cloth covering *a* is then stretched over the india-rubber and attached in the usual or any other suitable manner.

What I prefer for the comparatively incompressible facing is that preparation of the soft compound of vulcanizable india-rubber or allied gum known to those acquainted with that branch of the arts as india-rubber belting or packing, and which is composed by thoroughly incorporating with the preparation of gum the clippings or shearings of fibrous substances. The vulcanizable compound thus prepared is rolled into a sheet of uniform thickness, and while in the green or plastic state it is applied to the outer face of the soft compound, which is to form the elastic body or back, and while that is also in the plastic state, and thus united subjected to the usual vulcanizing process by heat, or the union of the two before vulcanizing may be effected in any other suitable manner. But the two parts may be separately vulcanized and then united by cement, or the facing D may be applied and held in front of and in contact with the elastic body or back C in any other suitable manner.

Cushions thus made will present important advantages over other combination-cushions known prior to my invention, such as have been made with steel, whalebone, or cork facing. As compared with cushions faced with steel they will not be so injurious to the balls, and when struck will not produce the unpleasant sound or "bang" so objectionable in steel-faced cushions; and as compared with whalebone or cork-faced cushions, they avoi l the numerous breaks and irregular density consequent upon the use of those substances, as the preparation of gum can be readily made of uniform density and rolled of equal thickness and of any desired length and breadth, to avoid all breaks in the length and breadth of each cushion; and, as compared with all of them, they are more durable and can be produced at much less cost; and although the face of such cushions will not be so hard as if faced with steel or whalebone, they will nevertheless be sufficiently so to avoid the inaccuracies due to an india-rubber cushion without such facing, for the ball will not embed itself in such a facing, and so long as this is avoided and the facing bends readily to the blow of the ball full effect is given to the resilient action of the elastic back.

What I claim as my invention, and desire to secure by Letters Patent, is—

Composing cushions for billiard-tables with a body or back of what is known as the soft compound of vulcanizable india-rubber or allied gum, in combination with a facing of india-rubber or allied gum rendered less compressible by fibrous matter or the equivalent thereof, substantially as described.

HUGH W. COLLENDER.

Witnesses:

ANDREW DE LACY,
WM. H. BISHOP.